United States Patent [19]

Rucker

[11] Patent Number: 5,662,140
[45] Date of Patent: Sep. 2, 1997

[54] INTERNALLY MOUNTED HIGH PRESSURE HYDRAULIC VALVE FOR VEHICULARLY MOUNTED WATER RECEIVING TANKS

[75] Inventor: William E. Rucker, Barboursville, W. Va.

[73] Assignee: Fireman's Friend Engineering, Inc., Silver Point, Tenn.

[21] Appl. No.: 543,451

[22] Filed: Oct. 16, 1995

[51] Int. Cl.$^6$ ........................................ F16K 15/00
[52] U.S. Cl. ........................................ 137/541; 137/592
[58] Field of Search ........................ 137/541, 592, 137/574, 540, 535, 528, 532; 251/336, 337

[56] References Cited

U.S. PATENT DOCUMENTS

| | | | |
|---|---|---|---|
| 272,684 | 2/1883 | Hall | 137/592 |
| 737,444 | 8/1903 | Moore | 137/592 |
| 1,013,158 | 1/1912 | Hahn | 137/541 |
| 1,075,022 | 10/1913 | Cooper | 137/592 |
| 1,349,515 | 8/1920 | Lombard | 137/541 |
| 3,447,565 | 6/1969 | Davis | 137/541 |
| 4,388,940 | 6/1983 | Powell | 137/541 |
| 4,482,017 | 11/1984 | Morris | 137/590 |
| 4,674,530 | 6/1987 | Bickford | 137/541 |
| 5,172,720 | 12/1992 | Richards | 137/541 |

FOREIGN PATENT DOCUMENTS 17522 of 1906 United Kingdom .

Primary Examiner—Denise L. Ferensic
Assistant Examiner—Ramyar M. Farid
Attorney, Agent, or Firm—Longacre & White

[57] ABSTRACT

A valve device installed within the interior of a water receiving tank. A cylindrically shaped housing has a pair of openings at either end and is substantially contained within the tank. A valve rod is movably mounted within the housing. A cap is attached to one end of the valve rod and engages an innermost end of the housing to form a water tight seal. A spring is mounted within the housing to bias the valve rod and cap to a closed position. A flange is secured to the other end of the housing and is mounted to the external surface of the tank. The flange is adapted to connect to a conventional water conduit to facilitate communication of water from a hydrant to the tank. When water, under sufficient pressure from a water source, enters the valve device, the cap and valve rod are urged inward opening the valve to allow water to fill the tank. When the pressure of the water source falls below a certain level, the valve device closes providing a water tight seal.

3 Claims, 3 Drawing Sheets

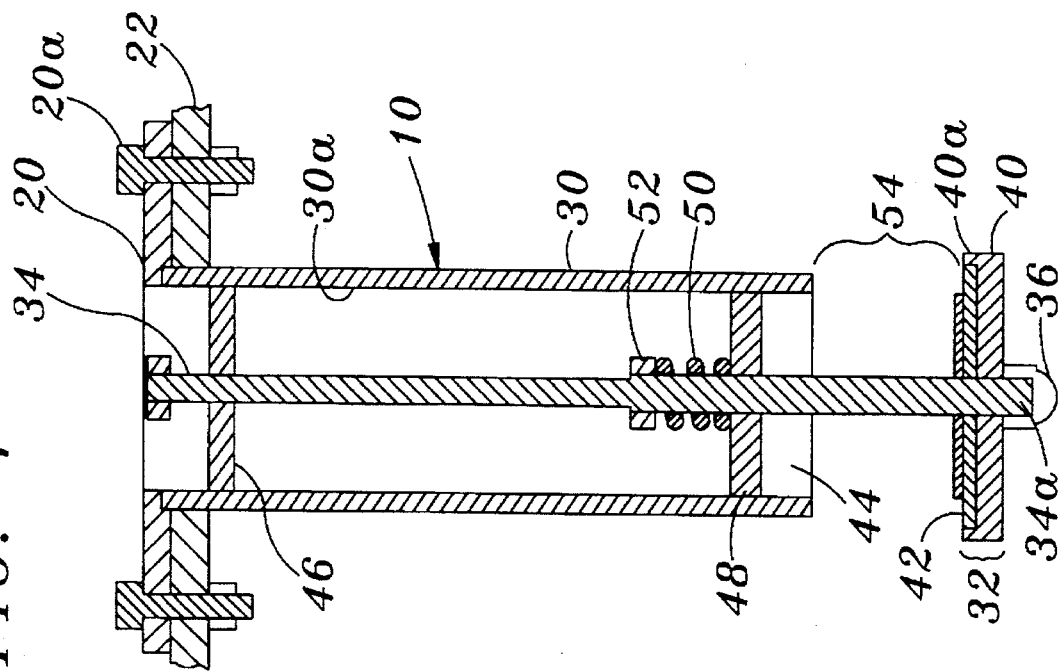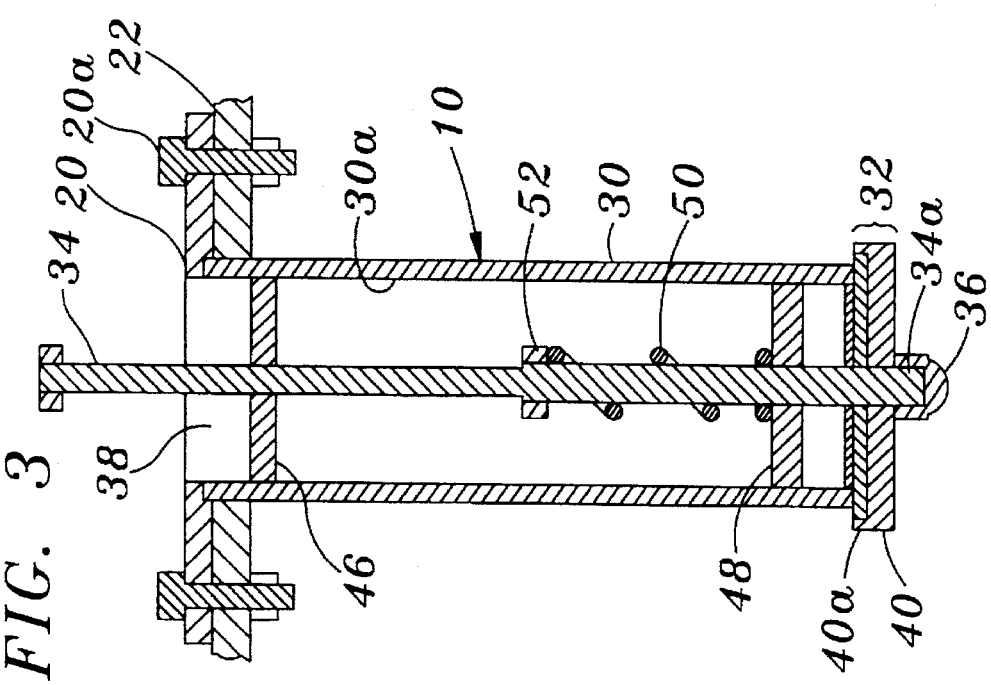

INTERNALLY MOUNTED HIGH PRESSURE HYDRAULIC VALVE FOR VEHICULARLY MOUNTED WATER RECEIVING TANKS

BACKGROUND OF THE INVENTION

The present invention relates to a water valve and more particularly to a high pressure water valve

SUMMARY OF THE INVENTION

A valve device in accordance with the present invention is adapted to be installed extending into the interior of a water receiving tank and basically comprises a cylindrically shaped housing having a pair of open ends, a valve rod and a cap assembly. One of the ends is adapted to be connected to a water conduit while the other is normally enclosed by the cap assembly. The valve rod extends into said housing, is mounted for movement along the central axis thereof, and is secured by its distal end to the valve cap assembly. The valve rod and cap assembly are biased so that the valve cap assembly normally closes the other of the two open ends of the housing in a water tight relationship. The entire housing of the valve is positioned within the tank receiving the water. When water is introduced into the housing under pressure, it causes the valve cap assembly to move away from the housing and to collectively define with the housing a circumferential opening, thereby permitting water to flow into the tank in a circumferential pattern.

DETAILED DESCRIPTION OF THE DRAWING

FIG. 3 is side sectional view of a valve in the normally closed position in accordance with the present invention; and FIG. 4 is side sectional view of a valve in the open position in accordance with the present invention.

DETAILED DESCRIPTION OF THE PREFERRED EMBODIMENT

Figure 1:
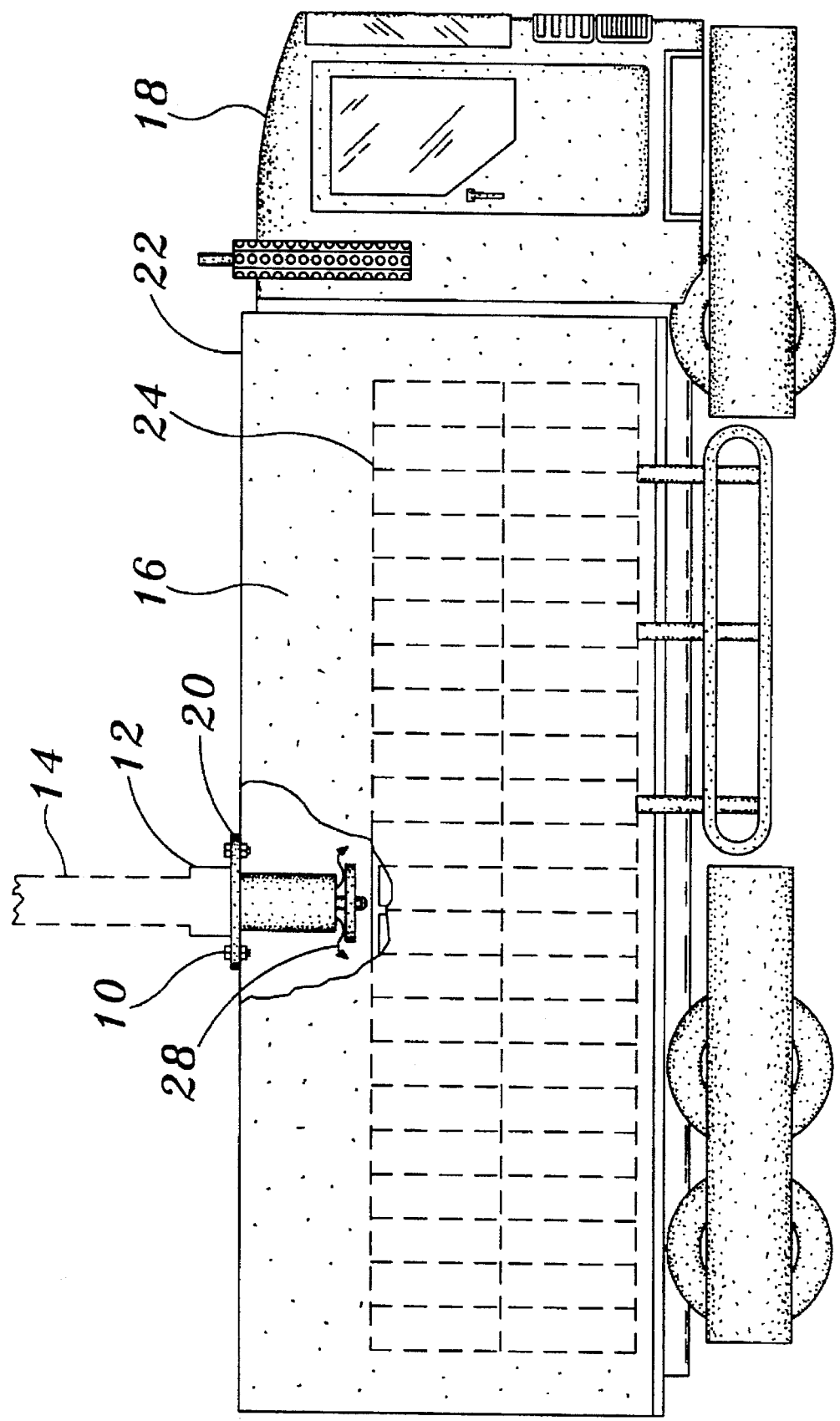
FIG. 1 is a side view in schematic of a valve in accordance with the present invention in place on a vehicle having a tank for receiving water.

The side view of FIG. 1 illustrates a valve 10 constructed in accordance with the present invention attached by a fitting 12 to water conduit or line 14. Line 14 leads to a remote source of water such as a hydrant (not shown). The major portion of valve 10 is located in the interior of a water receiving tank 16 of a vehicle 18 and attached by a flange 20 positioned on an exterior wall 22 of tank. The interior of tank 16 may be provided with a mechanism to minimize the physical movement of water within the interior due to turns, acceleration and deceleration of the vehicle. Such mechanism may be in the form of a baffle 24 shown by dashed lines that serves to prevent substantial wave action from occurring in the liquid contained by tank 16. Such baffles generally comprise a multiplicity of partially enclosed cells, the walls of which are usually fabricated from a compatible thermoplastic material. Direct impact of a water stream under high pressure could damage or destroy the baffle. However, as illustrated by arrows 28 showing direction of the water stream, valve 10 diverts the high pressure stream exiting from the opened valve into a circumferentially directed circular spray 28. The circular spray 28 prevents the occurrence of undesirable damage to the baffle.

Many tanks are fabricated from polyurethane or like materials that tend to flex. Valves mounted to the exterior surfaces of such tanks and externally protrude are good candidates for catching on foreign objects. The heavy nature of such exteriorly mounted hydraulic valves and the mechanical advantage exerted against the tank surface by contact with such objects may cause significant structural damage to the tank, particularly in the tank surface area around the valve. The interior mounting feature of valve 10, however, largely eliminates such problems. Moreover, the structure of the valve provides for light weight which further lessens the likelihood of structural damage due to the presence of the valve.

Figure 2:
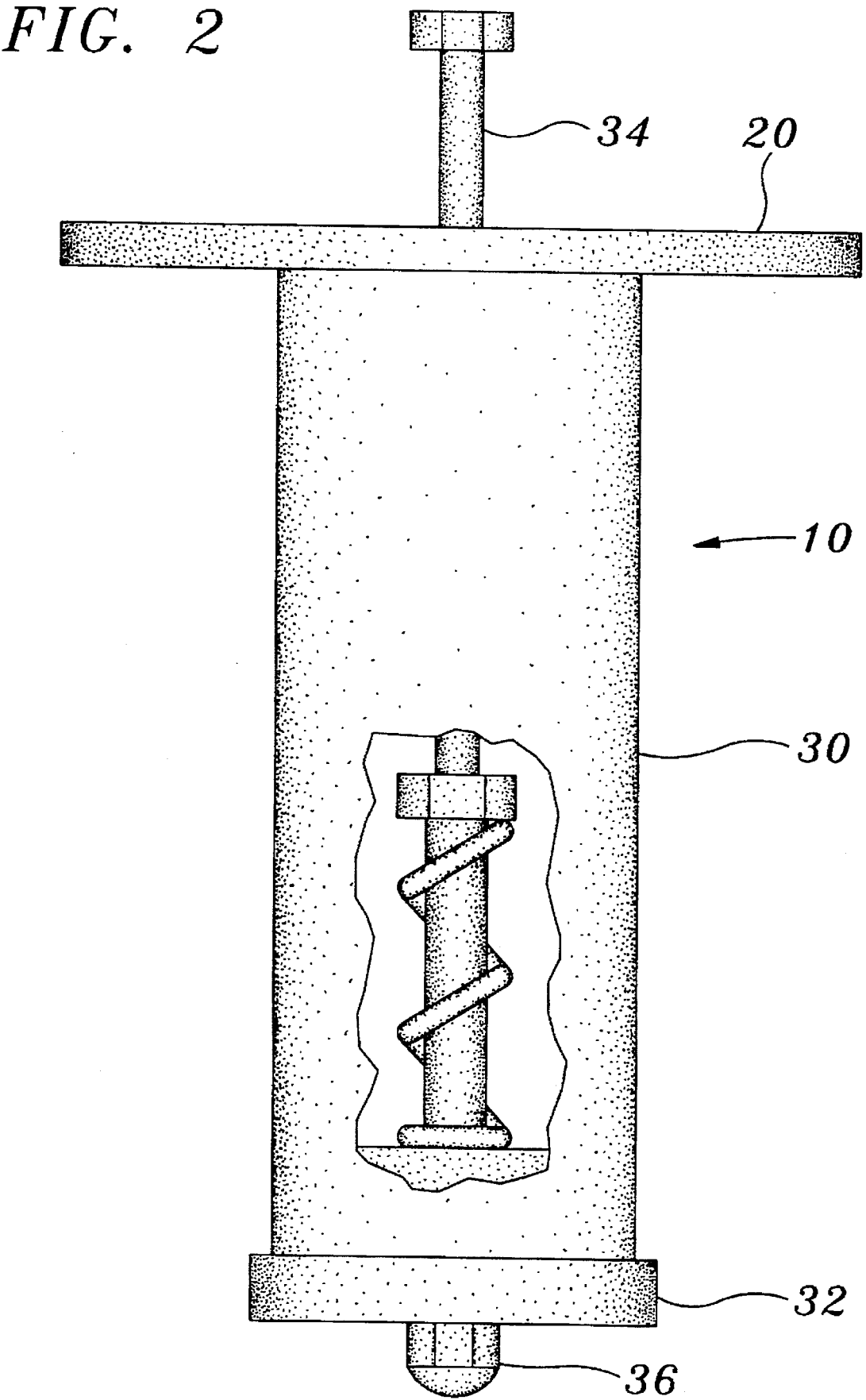
FIG. 2 is side view of a valve in accordance with the present invention in which a portion of the housing wall is broken away for a view of parts of the interior.

The side view of FIG. 2 and the sectional views of FIGS. 3 and 4 show that the external structure of valve 10 generally comprises a cylindrically shaped, main housing 30, a flange plate 20 to which housing 30 is attached, and valve cap assembly 32. A valve rod 34 runs the length of housing 28 and is secured to cap assembly 32 by cap nut 36 threadedly mounted on the distal end 34a of rod 34 (best seen in FIGS. 3 and 4). Preferably annular flange plate 20 has a beveled edge that seats against a complimentary edge of housing 30 and welded to the upper end of housing 28. The entire valve 10 is bolted by flange plate 20 to external wall 22 of tank and extends into the interior thereof.

Valve cap assembly 32 comprises a end plate 40 with a circumferentially disposed lip 40a that defines a seat for a annular gasket 42 and a gasket retainer plate 45. The entire assembly 32 is mounted about rod 34 with retainer plate 45 being tightly urged against rod stop 34a by cap nut 36. When valve 10 is in the closed position as illustrated in FIG. 3, the edge of housing 30 defining the opening 44 (oppositely disposed to opening 38) abuts gasket 42 thereby creating a watertight relationship with respect to cap assembly 32.

To maintain rod 34 axially aligned along the central axis of housing 30, a pair of spaced rod guides 46 and 48 are welded or otherwise secured to the inner surface 30a of housing 30. Rod 34 is mounted within bores in guides 46 and 48 for movement along the axis, A helical spring 50 is circumferentially mounted about rod 34 and abuts at one end against spring stop nut 52 threadedly engaged with rod 34 and at the other end against guide 48. Spring stop nut 52 can be moved along rod 34 to adjust the tension of spring 50 to a desired level. Spring 50 biases rod 34 toward opening 38 of housing 28 through pressure against stop nut 52 that in turn causes cap assembly to be biased into closing opening 44. Valve 10 is thus biased into a closed position.

Housing 30 may be fabricated from a 12 inch long aluminum tube having a 4 inch internal diameter and a wall thickness of about ¼ inch, The annular flange plate 20 may also be fabricated from an aluminum plate about ½ inch thick while it is preferable that rod 34 be made of brass and have a diameter of about ½ inch at the top end and a diameter of about ¾ inch at the lower end for mounting brass nut 52. Cap assembly 32 preferably is fabricated with an end plate 40 being about ¾ inch thick and having an internal diameter measured between lip edges of about 4⅜ inch. Gasket 42 is made of rubber or some other appropriate elastomer material and has a diameter slightly less than 4⅜ inch, Helical spring is preferably a 5 inch long coil spring fabricated from metallic material compatible with water.

Mounting the valve of the present invention is a simple operation in which an opening is formed in the wall of the tank of a diameter slightly larger than the diameter of the opening in flange 20. Flange 20 is provided with a plurality of holes and registered on the opening into the tank 22.

Holes are drilled into the wall of tank 22. Next, housing 22 with rod 34 and cap assembly 32 in place is positioned on and welded to flange 20. The housing 28 is then inserted through the hole into tank and flange 20 secured to the exterior surface of tank 22 by any appropriate fastening mechanism such as nut and bolt arrangement through the plurality of registered holes in the flange and tank wall.

An exterior conduit or water line 14 is then brought to the opening through flange 20 and locked to the flange plate. Water under pressure is then turned on, enters into housing 28 and impacts against the cap assembly 32, thus overcoming the biasing force of spring and causing the assembly 32 to move a distance away from housing 30 and, collectively with housing 30, defining a circumferentially disposed opening 54 through which water flows in a 360° pattern into the tank. While the filling valve of this invention has been shown and described with respect to a particular embodiment, it is understood to those possessing skill in the art that various changes to the form and detail may be made therein without departing from the spirit and scope of the invention.

I claim:

1. A hydraulic pressure fill valve in combination with a water receiving tank in a fire truck, said water receiving tank having an interior and an internal surface, said hydraulic valve comprising:

a cylindrically shaped housing mounted substantially within said interior of said water receiving tank, said housing defining a pair of first and second oppositely disposed openings, said second opening disposed within said water receiving tank and said first opening disposed adjacent said interior surface of said water receiving tank adapted to communicate with an external fluid source to facilitate filling said tank with a fluid;

a rod slidably mounted at least partially within said housing to allow said rod to longitudinally translate therein;

a valve cap secured to an end of said rod and adapted to engage said second opening of said housing to provide a seal therebetween, said valve cap comprising;

an end plate having a circumferentially disposed lip portion defining a recess and a centrally located bore through which said rod is disposed;

a retainer plate mounted to said rod;

an annular gasket having a center bore through which said rod is disposed, said annular gasket fitted in said recess of said end plate sandwiched between said end plate and said retainer plate;

a cap nut threadingly engaging a threaded end portion of said rod to urge said end plate towards said retainer plate to retain said annular gasket therebetween;

and a biasing means to urge said rod and valve cap such that said valve cap engages said second opening thereby providing said seal and preventing said fluid from passing through said valve; wherein, a pressure of said external fluid source above a predetermined level will overcome said biasing means to disengage said valve cap from said second opening to allow said fluid to enter said water receiving tank; said biasing means comprising;

a guide mounted to said internal surface of said cylindrically shaped housing, said guide including a bore through which said rod is slidingly disposed;

a stop nut mounted to said rod; wherein said stop nut is threadably adjustably secured to said rod to adjust the amount of pressure required to overcome said biasing means;

and a helical spring disposed about said rod and between said guide and said stop nut; wherein said helical spring urges said rod inward with respect to said cylindrically shaped housing such that said annular gasket engages said second opening thereby providing said seal.

2. The combination according to claim 1, further comprising:

a flange connected to said cylindrically shaped member adjacent said first opening and mounted to an external surface of said tank, said flange adapted to connect to a conventional conduit to communicate a remote hydrant to facilitate introduction of water into said tank, wherein said tank is mounted to a fire truck to facilitate the transportation of water to a remote location.

3. The combination according to claim 2, wherein said tank includes a plurality of internally mounted baffles, said annular gasket having a wider diameter than an external diameter of said cylindrically shaped housing such that when said valve is open and said fluid passes through said valve, said fluid impinges said annular gasket spreading said water to flow in a 360 degree pattern to reduce a force which said water impinges said baffles.

* * * * *